United States Patent
Chang et al.

(10) Patent No.: US 10,936,020 B2
(45) Date of Patent: Mar. 2, 2021

(54) ELECTRONIC DEVICE AND EXPANSION DEVICE

(71) Applicants: Ching-Shiang Chang, Taipei (TW);
Tung-Ying Wu, Taipei (TW);
Wang-Hung Yeh, Taipei (TW);
Po-Hsuan Wang, Taipei (TW);
Chien-Feng Chan, Taipei (TW);
Ming-Cheng Tsou, Taipei (TW)

(72) Inventors: Ching-Shiang Chang, Taipei (TW);
Tung-Ying Wu, Taipei (TW);
Wang-Hung Yeh, Taipei (TW);
Po-Hsuan Wang, Taipei (TW);
Chien-Feng Chan, Taipei (TW);
Ming-Cheng Tsou, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 16/547,610

(22) Filed: Aug. 22, 2019

(65) Prior Publication Data

US 2020/0081498 A1    Mar. 12, 2020

Related U.S. Application Data

(60) Provisional application No. 62/722,179, filed on Aug. 24, 2018, provisional application No. 62/790,435, filed on Jan. 9, 2019.

(51) Int. Cl.
*G06F 1/16* (2006.01)

(52) U.S. Cl.
CPC .......... *G06F 1/1679* (2013.01); *G06F 1/1616* (2013.01); *G06F 1/1632* (2013.01); *G06F 1/1649* (2013.01)

(58) Field of Classification Search
CPC .... G06F 1/1679; G06F 1/1616; G06F 1/1632; G06F 1/1649
See application file for complete search history.

(56) References Cited

U.S. PATENT DOCUMENTS 6,233,138 B1 *   5/2001   Osgood ................. G06F 1/1616
                                                          248/920
6,266,241 B1 *   7/2001   Van Brocklin ....... G06F 1/1616
                                                          361/679.46

(Continued)

FOREIGN PATENT DOCUMENTS

CN   201222206    4/2009
CN   102095054    6/2011

(Continued)

OTHER PUBLICATIONS

"Office Action of Taiwan Counterpart Application", dated Jun. 16, 2020, p. 1-p. 5.

*Primary Examiner* — Abhishek M Rathod
*Assistant Examiner* — Keith DePew
(74) *Attorney, Agent, or Firm* — JCIPRNET

(57) ABSTRACT

An electronic device includes a base, a lifting mechanism, a body and a switching mechanism. The lifting mechanism and the body are movably disposed at the base. The lifting mechanism is located between the body and the base, and two ends of the lifting mechanism are connected to the body and the base. The switching mechanism is disposed at the base. The switching mechanism is configured to lock the body and the lifting mechanism to the base or configured to remove a locking relationship of the body and the lifting mechanism with respect to the base. An expansion device is further provided.

26 Claims, 17 Drawing Sheets

(56) References Cited

U.S. PATENT DOCUMENTS

| | | | | |
|---|---|---|---|---|
| 6,295,038 B1* | 9/2001 | Rebeske | G06F 1/1616 | 345/1.1 |
| 6,341,061 B1* | 1/2002 | Eisbach | G06F 1/1616 | 312/223.2 |
| 6,392,871 B1* | 5/2002 | Yanase | G06F 1/162 | 345/905 |
| 6,532,147 B1* | 3/2003 | Christ, Jr. | G06F 1/1615 | 248/917 |
| 6,895,638 B2* | 5/2005 | Lin | G06F 1/1618 | 16/368 |
| 7,136,282 B1* | 11/2006 | Rebeske | G06F 1/1616 | 361/679.55 |
| 7,239,505 B2* | 7/2007 | Keely | G06F 1/1616 | 361/679.09 |
| 7,245,484 B2* | 7/2007 | Langerhans | G06F 1/1616 | 248/615 |
| 7,403,377 B2* | 7/2008 | Deluga | G06F 1/1616 | 361/679.55 |
| 7,656,663 B2* | 2/2010 | Zhao | G06F 1/1616 | 361/679.58 |
| 7,804,679 B2* | 9/2010 | Pischl | G06F 1/1601 | 361/679.04 |
| 7,813,125 B2* | 10/2010 | Huang | E05B 15/024 | 361/679.58 |
| 7,821,780 B2* | 10/2010 | Choy | G06F 1/3265 | 361/679.06 |
| 7,864,524 B2* | 1/2011 | Ladouceur | G06F 3/0221 | 361/679.55 |
| 7,991,442 B2* | 8/2011 | Kim | G06F 1/1679 | 455/575.4 |
| 8,035,963 B2* | 10/2011 | Ladouceur | G06F 3/03547 | 361/679.55 |
| 9,019,691 B1* | 4/2015 | Matsuoka | G06F 1/1637 | 361/679.01 |
| 9,277,659 B2* | 3/2016 | Onda | F16M 11/38 | |
| 9,501,097 B2* | 11/2016 | Moser | G06F 1/1649 | |
| 9,651,995 B2* | 5/2017 | Zeng | G06F 1/1641 | |
| 10,001,806 B2* | 6/2018 | Cheng | G06F 1/1616 | |
| 2003/0103324 A1* | 6/2003 | Gallivan | G06F 1/1683 | 361/679.27 |
| 2003/0142469 A1* | 7/2003 | Ponx | G06F 1/1679 | 361/679.04 |
| 2004/0125549 A1* | 7/2004 | Iredale | G06F 1/1616 | 361/679.06 |
| 2005/0138775 A1* | 6/2005 | Oakley | G06F 1/1616 | 16/368 |
| 2006/0138784 A1* | 6/2006 | Wang | G06F 1/1679 | 292/24 |
| 2006/0146489 A1* | 7/2006 | Huang | E05B 73/0082 | 361/679.27 |
| 2007/0285343 A1* | 12/2007 | Han | G06F 1/1637 | 345/1.3 |
| 2008/0062625 A1* | 3/2008 | Batio | G06F 1/1615 | 361/679.29 |
| 2008/0304217 A1* | 12/2008 | Lai | G06F 1/1616 | 361/679.26 |
| 2009/0086424 A1* | 4/2009 | Jette | G06F 1/1601 | 361/679.55 |
| 2009/0231795 A1* | 9/2009 | Green | G06F 1/1616 | 361/679.27 |
| 2010/0103603 A1* | 4/2010 | Wu | G06F 1/1616 | 361/679.05 |
| 2011/0228463 A1* | 9/2011 | Matagne | G06F 1/1649 | 361/679.04 |
| 2012/0217855 A1* | 8/2012 | Chen | G06F 1/1616 | 312/323 |
| 2013/0182396 A1* | 7/2013 | Hu | H05K 5/0226 | 361/729 |
| 2014/0139987 A1* | 5/2014 | Onda | H04M 1/0216 | 361/679.02 |
| 2015/0036273 A1* | 2/2015 | Hui | G06F 1/1683 | 361/679.08 |
| 2015/0185786 A1* | 7/2015 | Yeh | F16M 11/10 | 361/679.55 |
| 2018/0188781 A1* | 7/2018 | Park, Jr. | E05D 7/082 | |
| 2018/0210504 A1* | 7/2018 | Moser | G06F 1/1616 | |
| 2018/0232543 A1* | 8/2018 | Mori | H05K 5/0221 | |

FOREIGN PATENT DOCUMENTS

| | | |
|---|---|---|
| CN | 102375480 | 3/2012 |
| CN | 207182152 | 4/2018 |
| TW | I598018 | 9/2017 |

* cited by examiner

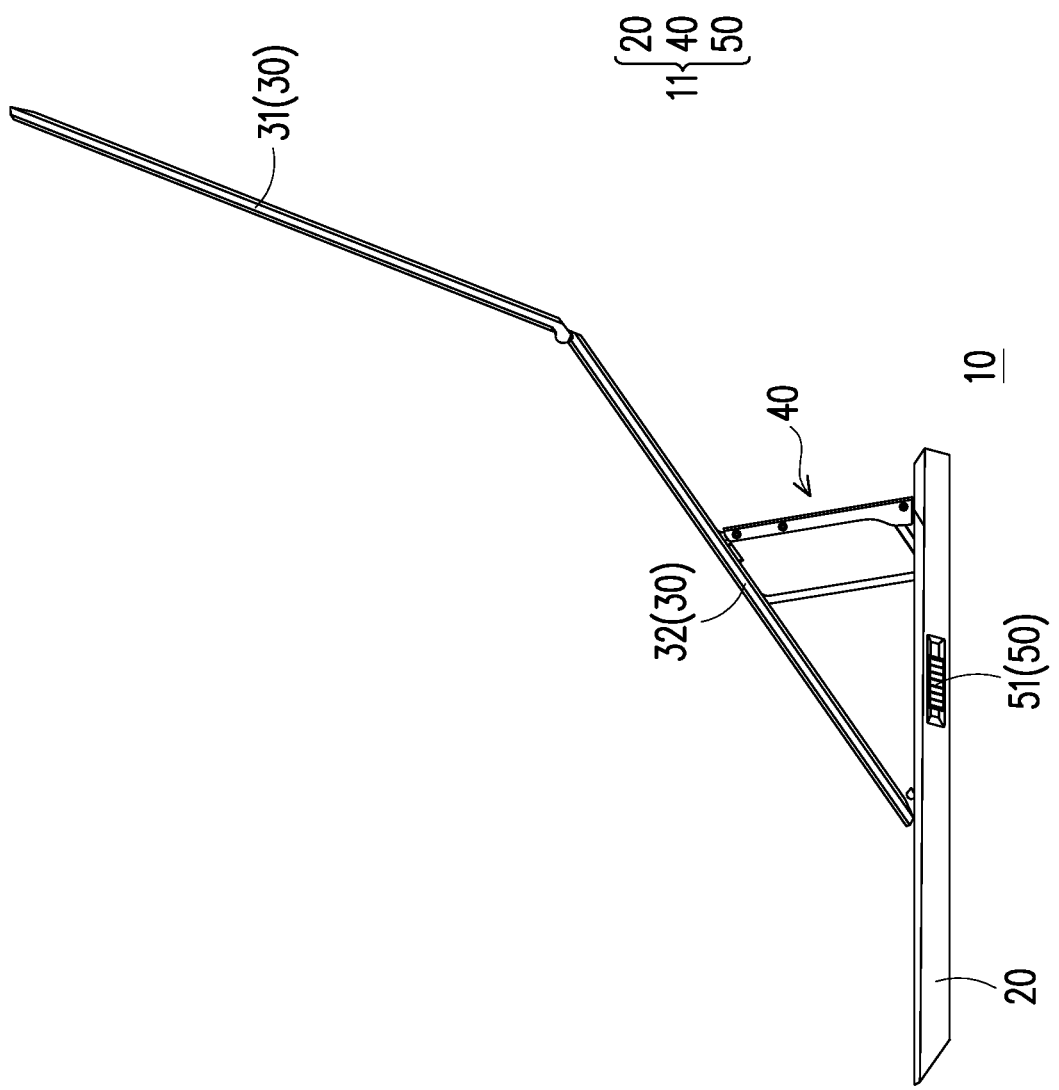

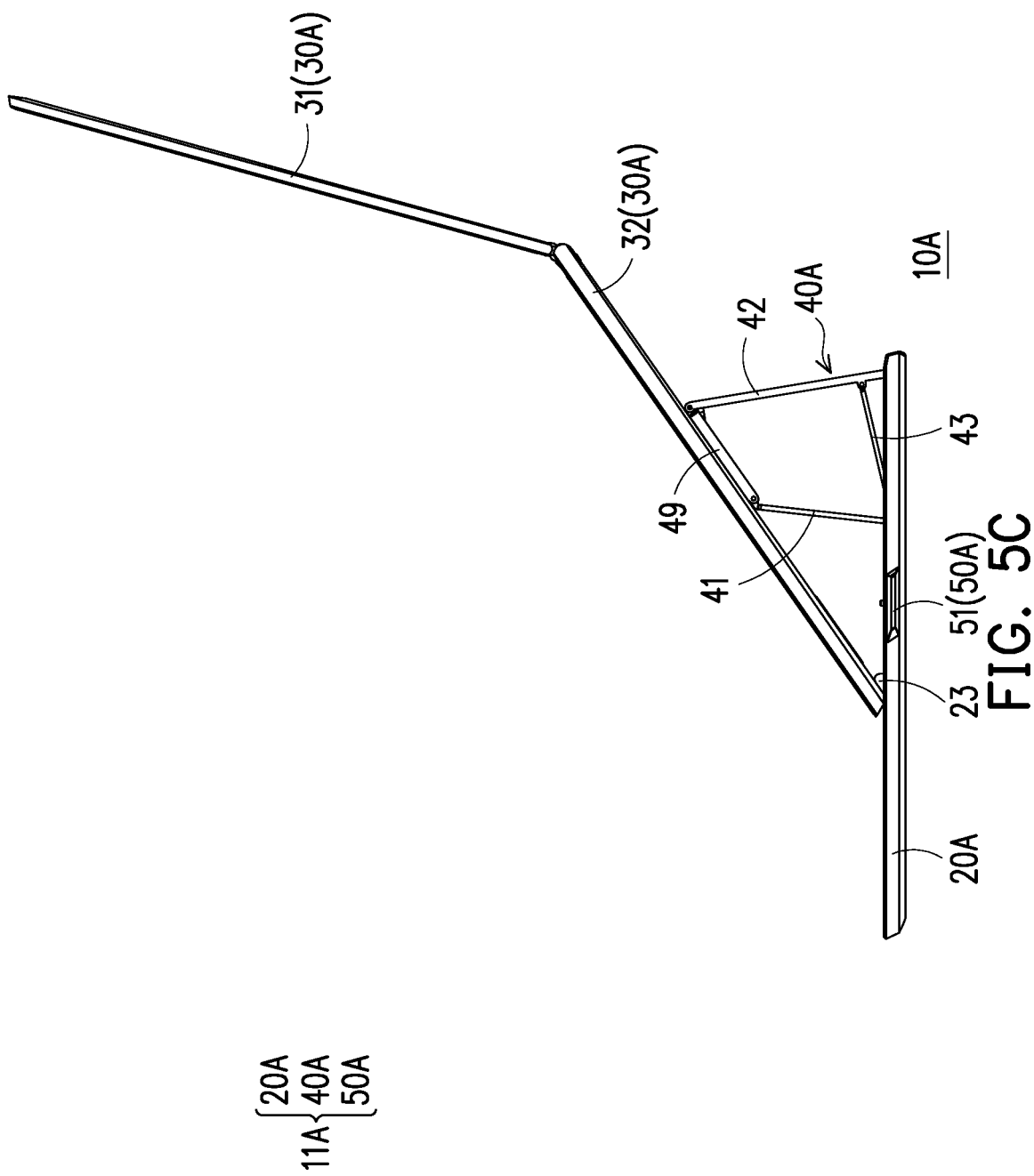

ELECTRONIC DEVICE AND EXPANSION DEVICE

CROSS REFERENCE TO RELATED APPLICATION

This application claims the priority benefits of U.S. provisional application Ser. No. 62/722,179, filed on Aug. 24, 2018, and U.S. provisional application Ser. No. 62/790,435, filed on Jan. 9, 2019. The entirety of each of the above-mentioned patent applications is hereby incorporated by references herein and made a part of specification.

BACKGROUND OF THE DISCLOSURE

Field of the Disclosure

The present disclosure generally relates to an electronic device and an expansion device, and particularly, to an electronic device configured with a lifting mechanism and an expansion device configured with a lifting mechanism.

Description of Related Art

In order to transmit and receive information or process information instantly, portable electronic devices have become an indispensable tool for modern people. Common portable electronic devices include a notebook computer, a tablet computer and a smart phone. During the operation of the notebook computer, a user mostly places the notebook computer on a desktop, so a viewing angle is limited, and the user easily feels tired in eyes. During the operation of the tablet computer or the smart phone, the user mostly holds the tablet computer or the smart phone in hands, so the user easily feels tired in muscles of the hands. Accordingly, supporting stands applied to the notebook computer, the tablet computer and the smart phone have been provided. However, common supporting stands have the defects that a supporting angle cannot be changed, the switching of the supporting angle must be manually operated in the whole process, the operation flexibility is poor, or a shifting mechanism is not intuitive, and the like.

SUMMARY OF THE DISCLOSURE

The present disclosure provides an electronic device which has excellent operation flexibility, and a shifting mechanism for operation modes is quite intuitive.

The present disclosure provides an expansion device which has excellent operation flexibility, and a shifting mechanism for operation modes is quite intuitive.

The present disclosure provides an electronic device, including a base, a lifting mechanism, a body and a switching mechanism. The lifting mechanism and the body are movably disposed at the base. The lifting mechanism is located between the body and the base, and two ends of the lifting mechanism are connected to the body and the base. The switching mechanism is configured to lock the body and the lifting mechanism to the base or configured to remove a locking relationship of the body and the lifting mechanism with respect to the base.

In one embodiment of the present disclosure, the switching mechanism includes a switch button, a switch lever and a locking member, and the switch button is slidably disposed at a side of the base. The switch lever is rotatably disposed at the base, and the switch lever includes a first lever end and a second lever end. The first lever end is connected to the switch button, and the second lever end is connected to the locking member. The locking member is configured to lock the body and the lifting mechanism to the base or configured to remove the locking relationship of the body and the lifting mechanism with respect to the base.

In one embodiment of the present disclosure, the locking member is rotatably disposed at the base, and the locking member includes a first engaging portion facing the body. The body includes a second engaging portion facing the base, and the first engaging portion is engaged with or separated from the second engaging portion.

In one embodiment of the present disclosure, the locking member is slidably disposed at the base, and the locking member includes a first engaging portion facing the lifting mechanism. The lifting mechanism includes a second engaging portion facing the base, and the first engaging portion is engaged with or separated from the second engaging portion.

In one embodiment of the present disclosure, the switch lever has a pivoting portion, and the pivoting portion is pivoted to the base. The pivoting portion is located between the first lever end and the second lever end.

In one embodiment of the present disclosure, the switch lever further has a pivoting limiting portion, and the pivoting limiting portion is located between the pivoting portion and the first lever end. The switching mechanism further includes a pivoting limiting member. The pivoting limiting member is engaged with the pivoting limiting portion, or the pivoting limiting member is pressed by the body or a force to be separated from the pivoting limiting portion.

In one embodiment of the present disclosure, the base has a recess configured to receive the lifting mechanism.

In one embodiment of the present disclosure, the lifting mechanism includes a first stand, a second stand and a link. The first stand has a first end and a second end. The first end is slidably connected to the base, and the second end is pivoted to the body. The second stand has a third end and a fourth end. The third end is pivoted to the base, and the fourth end is pivoted to the body. The link has a fifth end and a sixth end. The fifth end is pivoted to the first end, and the sixth end is pivoted to the second stand. The sixth end is located between the third end and the fourth end.

In one embodiment of the present disclosure, the lifting mechanism further includes a spring. The spring is disposed at the third end of the second stand.

In one embodiment of the present disclosure, the lifting mechanism further includes a supporting plate configured to carry the body. The second end of the first stand is pivoted to the supporting plate, and the fourth end of the second stand is pivoted to the supporting plate.

In one embodiment of the present disclosure, the supporting plate has a positioning convex portion, and the body has a positioning concave portion. The positioning convex portion is inserted into the positioning concave portion.

In one embodiment of the present disclosure, the supporting plate has a positioning convex portion, and the positioning convex portion is back on to the base.

In one embodiment of the present disclosure, the positioning convex portion of the supporting plate is provided with a plurality of conductive terminals.

In one embodiment of the present disclosure, the lifting mechanism further includes a baffle plate connected to the second stand, and the second stand is located between the first stand and the baffle plate.

In one embodiment of the present disclosure, the lifting mechanism further includes a damping element. The damping element is connected to the first end of the first stand.

In one embodiment of the present disclosure, the base is provided with a keyboard, and the lifting mechanism and the keyboard are arranged side by side.

In one embodiment of the present disclosure, the base is provided with a lifting cushion and a groove for receiving the lifting cushion, and the lifting cushion is located between the lifting mechanism and the keyboard. The lifting cushion at least partially moves out of the groove to allow the side of the body to lean against thereon or the lifting cushion is pressed by the body to sink into the groove.

In one embodiment of the present disclosure, the keyboard is covered by the body. After the body rises up with the lifting mechanism, the keyboard is exposed outside.

In one embodiment of the present disclosure, the body includes a first display and a second display. The first display is pivoted to the second display, and the second display is connected to the lifting mechanism.

In one embodiment of the present disclosure, the size of the first display is equal to that of the second display.

The present disclosure provides an electronic device, including a base, a lifting mechanism and a switching mechanism. The lifting mechanism is movably disposed at the base. The switching mechanism is disposed at the base. The switching mechanism includes a switch lever, and the switch lever is rotatably disposed at the base. The switching mechanism is configured to lock the lifting mechanism to the base or configured to remove a locking relationship of the lifting mechanism with respect to the base.

Based on the above, the lifting mechanisms of the electronic device and the expansion device of the present disclosure may rise up or drop off relative to the base, so as to change an inclination angle of the body relative to the base. Further, the locking relationship of the body and the lifting mechanism with respect to the base is determined by the switching mechanism, so that the body and the lifting mechanism may be locked to the base through the switching mechanism, or the locking relationship of the body and the lifting mechanism with respect to the base is removed by the switching mechanism. Therefore, for the user, the electronic device and the expansion device of the present disclosure have excellent operation flexibility, and the shifting mechanism for operation modes is quite intuitive.

In order to make the aforementioned and other objectives and advantages of the present disclosure comprehensible, embodiments accompanied with figures are described in detail below.

BRIEF DESCRIPTION OF THE DRAWINGS

FIG. 1A to FIG. 1C are side-view diagrams of an electronic device of a first embodiment of the present disclosure under different operation modes.

FIG. 5A to FIG. 5C are side-view diagrams of an electronic device of a second embodiment of the present disclosure under different operation modes.

DESCRIPTION OF THE EMBODIMENTS

Figure 1A:
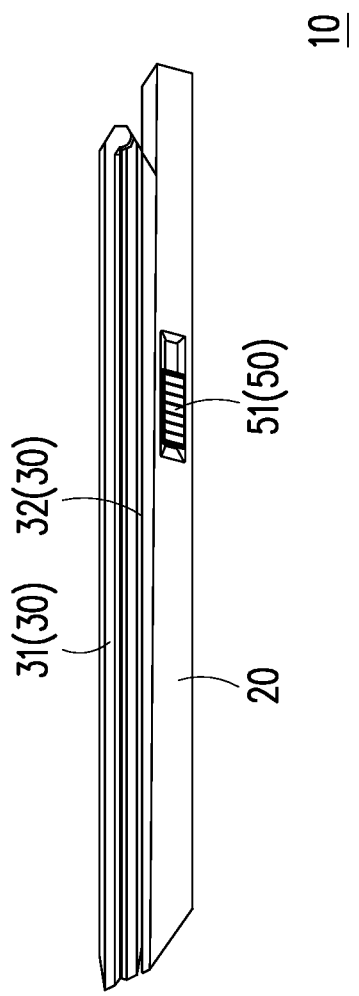
Figure 1B:
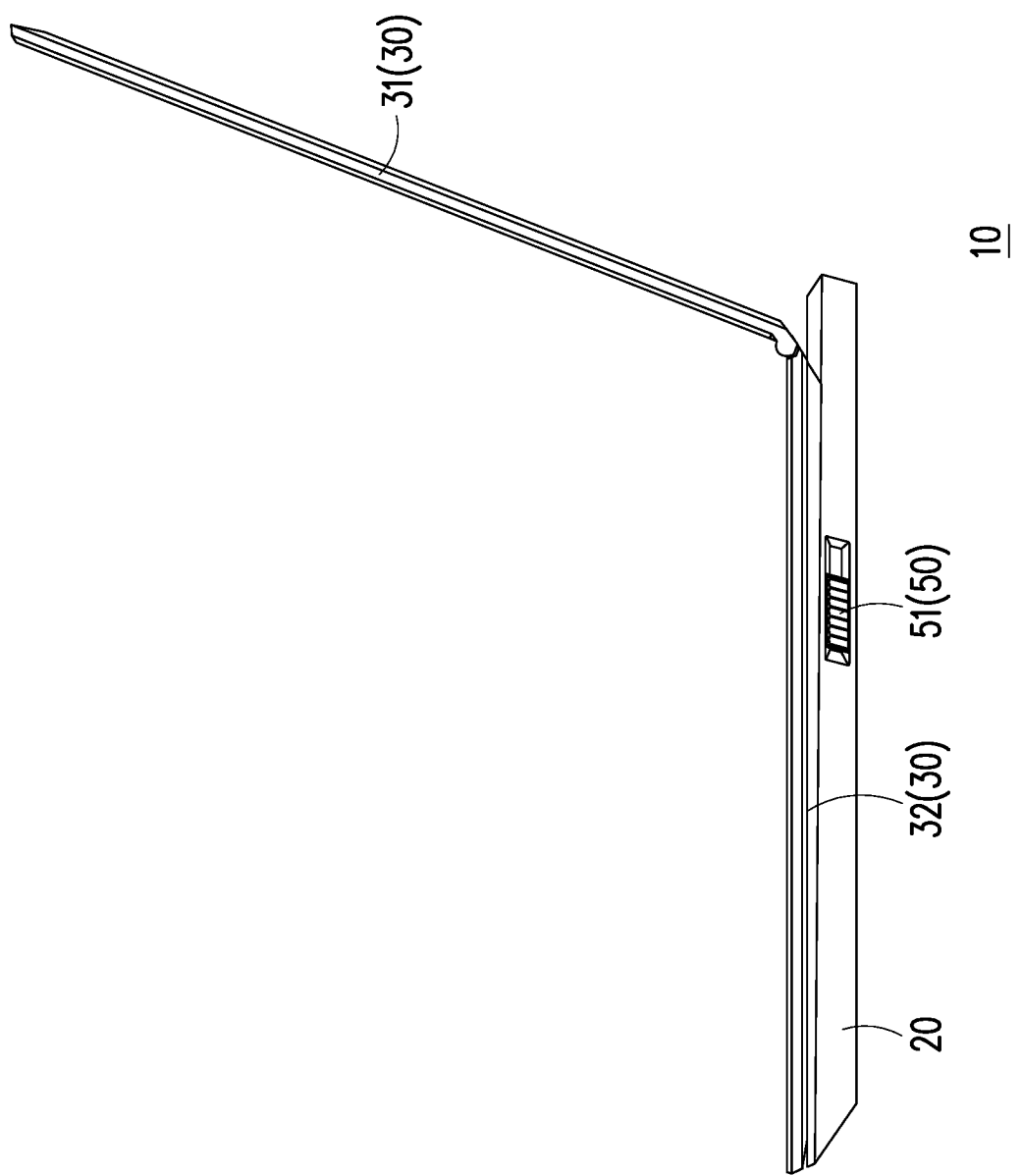

FIG. 1A to FIG. 1C are side-view diagrams of an electronic device of a first embodiment of the present disclosure under different operation modes. Referring to FIG. 1A to FIG. 1C, in the present embodiment, the electronic device 10 may be a notebook computer or a combination of a tablet computer and an expansion device. The electronic device 10 includes a base 20, a body 30 and a lifting mechanism 40. The body 30 and the lifting mechanism 40 are both movably disposed at the base 20. The lifting mechanism 40 is located between the body 30 and the base 20, and two ends of the lifting mechanism 40 are connected to the body 30 and the base 20. The body 30 may rise up or drop off with the lifting mechanism 40 relative to the base 20, so as to change an inclination angle of the body 30 relative to the base 20.

Further, the body 30 includes a first display 31 and a second display 32 which are pivoted to each other, and the first display 31 and the second display 32 may have a touch function. As shown in FIG. 1A, the first display 31 and the second display 32 are in a folded state, and a back side of the second display 32 is attached to the base 20. As shown in FIG. 1B, the first display 31 and the second display 32 are converted to an unfolded state, and the back side of the second display 32 is attached to the base 20. For example, the second display 32 may be configured to display a virtual keyboard or virtual operating interface, and thus facilitating a user to operate the body 30. As shown in FIG. 1C, one end of the lifting mechanism 40 is connected to the second display 32, and the first display 31 and the second display 32 which are in the unfolded state rise up with the lifting mechanism 40 relative to the base 20, so that the second display 32 is inclined to the base 20. On the other hand, a side of the second display 32 may lean against the base 20 to improve the stability of the body 30 in the inclined state.

For example, the size of the first display 31 is equal to that of the second display 32, and the size of a display screen of the first display 31 may be equal to that of a display screen of the second display 32. After the first display 31 and the second display 32 are unfolded, the user may switch or operate screen images in the first display 31 and the second display 32 according to personal needs, and the first display 31 and the second display 32 are spliced to obtain a relatively large screen image, such as a doubled screen image. Further, the first display 31 and the second display 32 are supported by the lifting mechanism 40 and the base 20, and viewing angles of the first display 31 and the second display 32 may be adjusted by the rise and drop of the lifting mechanism 40, and thus contributing to relieve the fatigue of the eyes of the user.

Figure 2A:
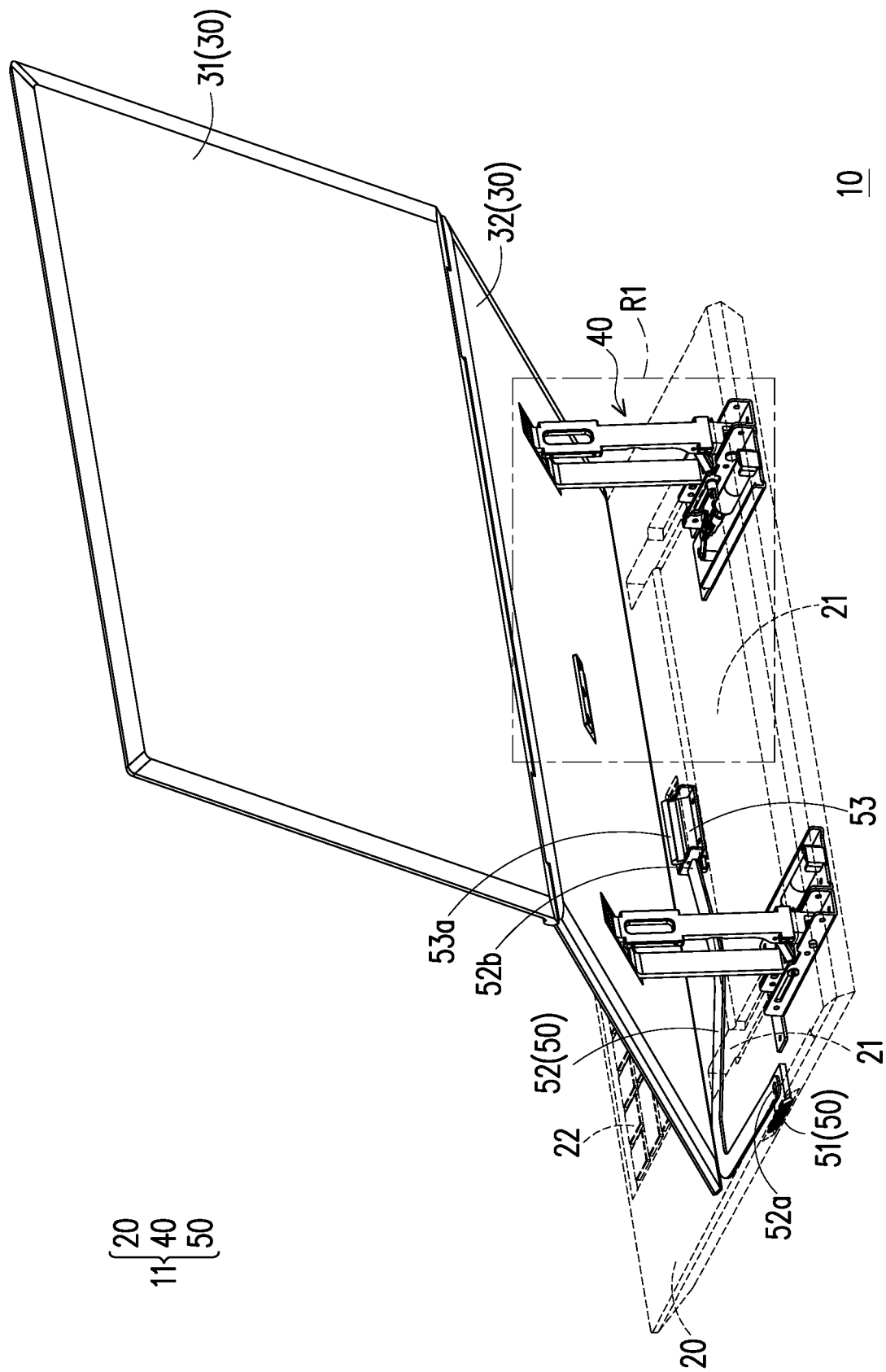
FIG. 2A is a schematic diagram of the electronic device of FIG. 1C.
Figure 2B:
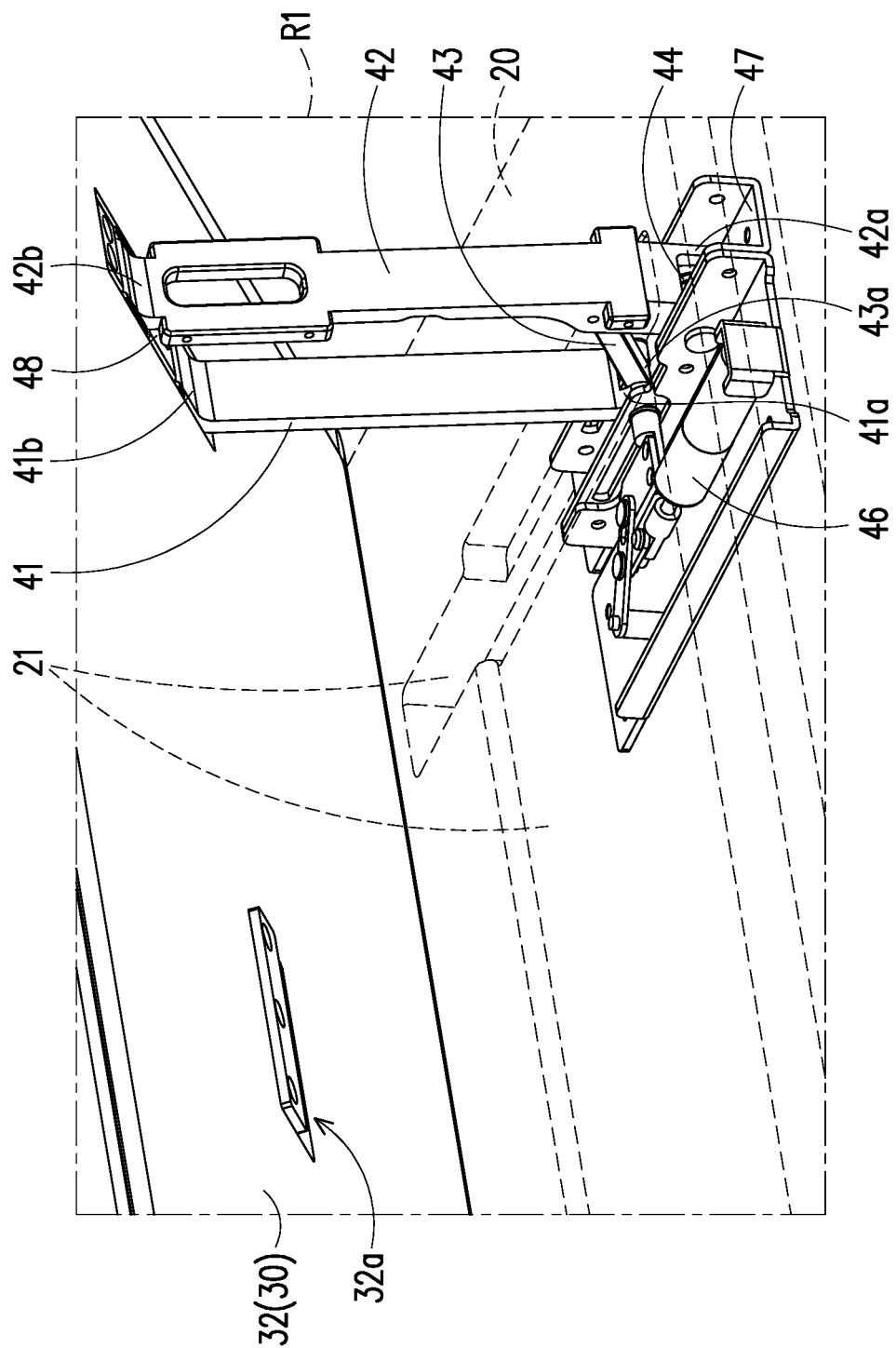
FIG. 2B is a partially enlarged diagram of a region R1 of FIG. 2A.
Figure 3:
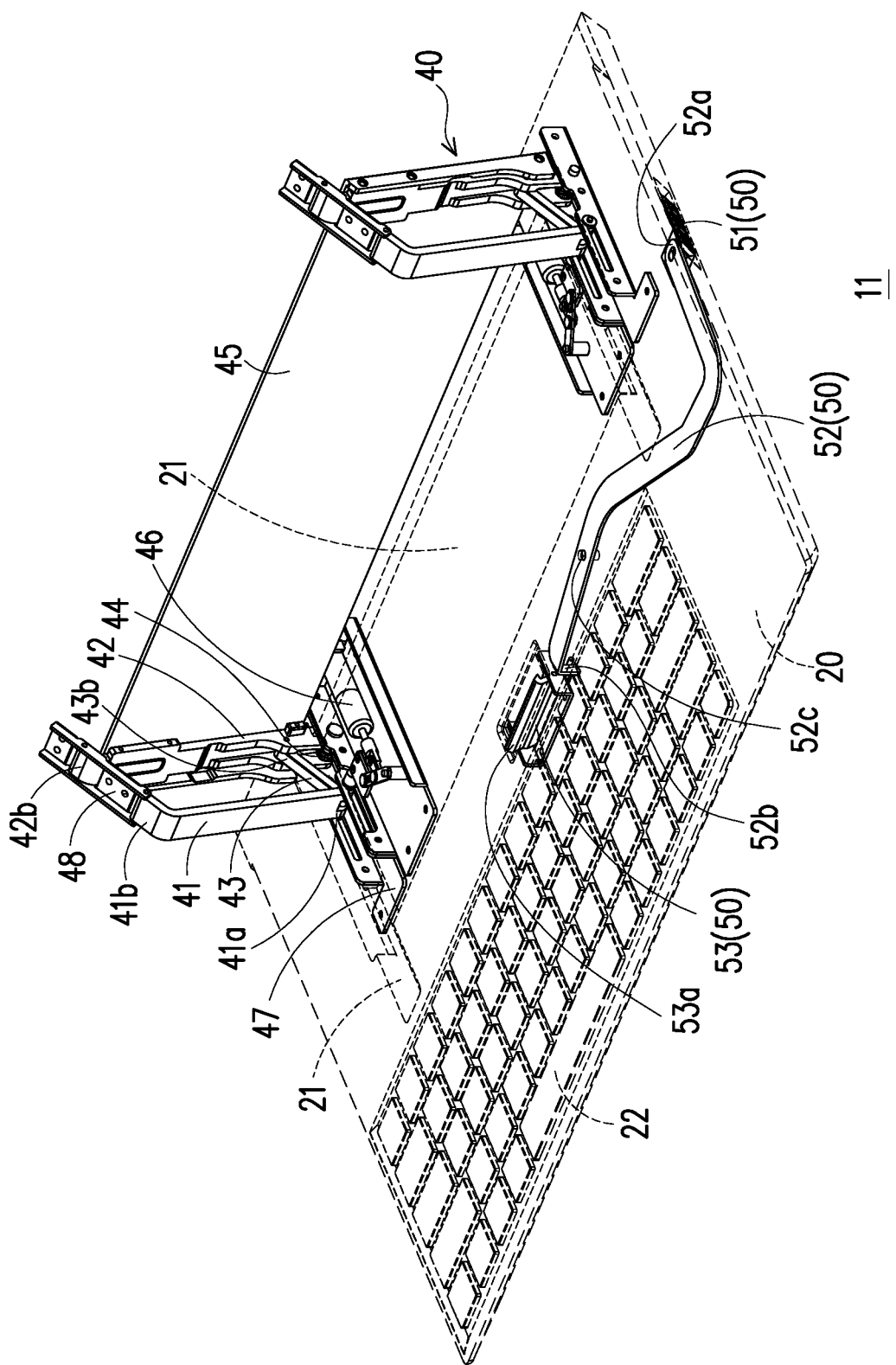
FIG. 3 is a schematic diagram of an expansion device of FIG. 1C.
Figure 4A:
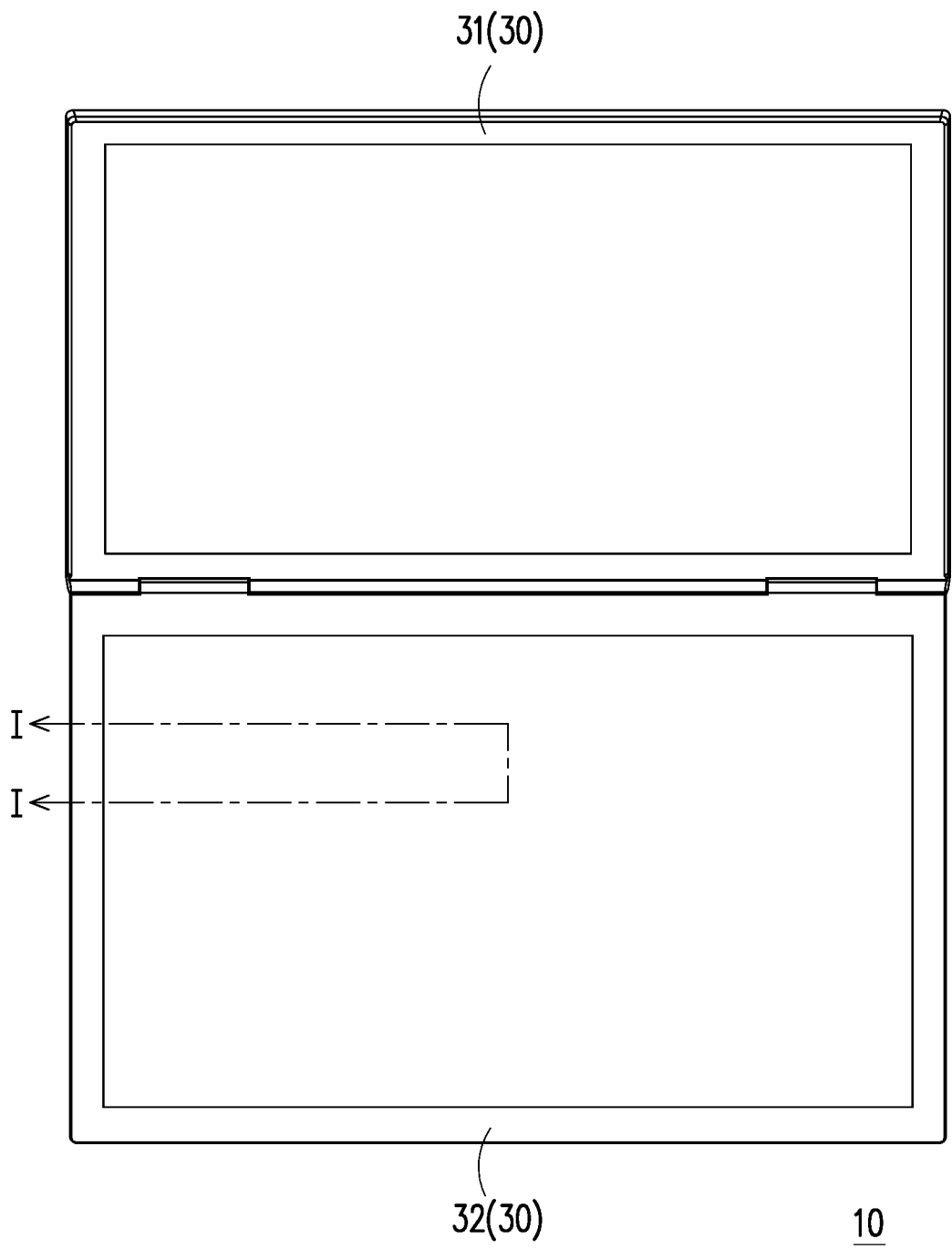
FIG. 4A is a top-view diagram of the electronic device of FIG. 1B.
Figure 4B:
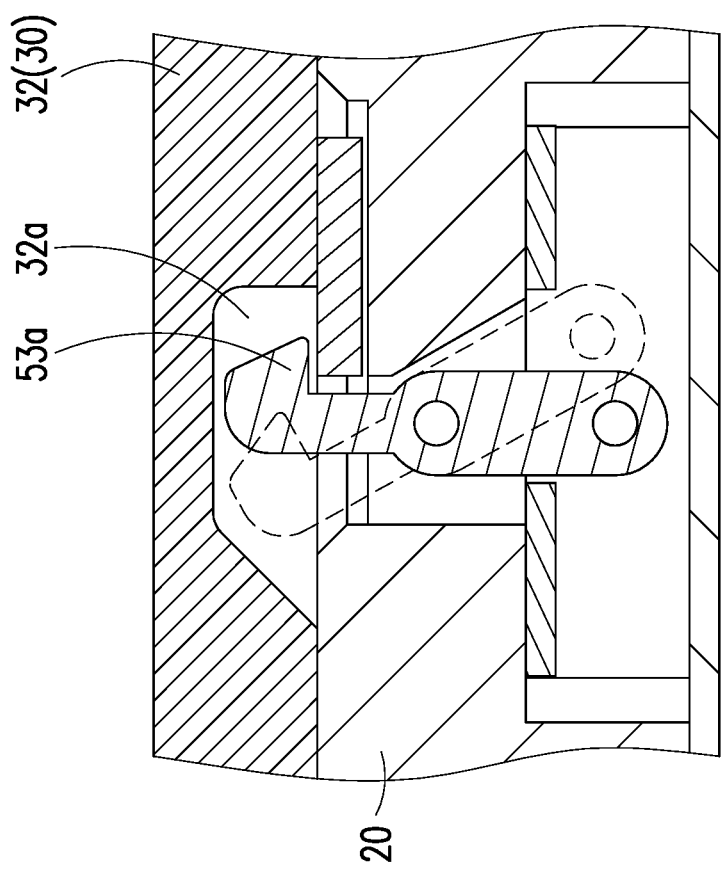
FIG. 4B is a partially cross-sectional enlarged diagram along a section line I-I of FIG. 4A.

FIG. 2A is a schematic diagram of the electronic device of FIG. 1C. FIG. 2B is a partially enlarged diagram of a region R1 of FIG. 2A. FIG. 3 is a schematic diagram of an expansion device of FIG. 1C. FIG. 4A is a top-view diagram of the electronic device of FIG. 1B. FIG. 4B is a partially cross-sectional enlarged diagram along a section line I-I of FIG. 4A. For clear illustration, part of members in FIG. 2A to FIG. 3 are illustrated by dotted lines, and a baffle plate 45 is omitted in FIG. 2A and FIG. 2B. Referring to FIG. 1A to FIG. 2A, in the present embodiment, the electronic device 10 further includes a switching mechanism 50. The switching mechanism 50 is disposed at the base 20, and a combination of the switching mechanism 50, the lifting mechanism 40 and the base 20 may be regarded as an expansion device 11. The body 30 is detachably mounted on the lifting mechanism 40, and one end of the lifting mechanism 40 is rotatably connected to the body 30.

In detail, the switching mechanism 50 includes a switch button 51, a switch lever 52 and a locking member 53. The switch button 51 is slidably disposed at a side of the base 20, and thus facilitating the user to operate the switch button 51. As shown in FIG. 2A and FIG. 3, the switch lever 52 is rotatably disposed at the base 20, and the switch lever 52 includes a first lever end 52a, a second lever end 52b and a pivoting portion 52c. The first lever end 52a is connected to the switch button 51, and the first lever end 52a has a freedom of motion of rotation and sliding relative to the switch button 51. The second lever end 52b is connected to the locking member 53. The locking member 53 is rotatably disposed at the base 20, and the second lever end 52b is configured to drive the locking member 53 to rotate. The pivoting portion 52c may be a pivoting hole of the switch lever 52, and a positioning pin of the base 20 is inserted into the pivoting portion 52c. The pivoting portion 52c is located between the first lever end 52a and the second lever end 52b and serves as a rotation fulcrum of the switch lever 52.

Referring to FIG. 1A to FIG. 2B, when the user drives the switch button 51 to slide, the switch button 51 drives the switch lever 52 to rotate, and the first lever end 52a and the second lever end 52b rotate around the pivoting portion 52c (see FIG. 3). Then, the locking member 53 is driven by the second lever end 52b to rotate relative to the base 20, and a rotation reference axis of the switch lever 52 is not parallel to that of the locking member 53.

Referring to FIG. 2A to FIG. 4B, the locking member 53 includes a first engaging portion 53a facing the body 30. The body 30 includes a second engaging portion 32a facing the base 20. The second engaging portion 32a is disposed at the back side of the second display 32. For example, the first engaging portion 53a may be a hook, the second engaging portion 32a may be a slot, and the first engaging portion 53a extends out of the base 20 to be engaged with the second engaging portion 32a. In a state that the body 30 (i.e., the back side of the second display 32) is attached to the base 20 and the first engaging portion 53a is engaged with the second engaging portion 32a, the lifting mechanism 40 is unable to rise up relative to the base 20, so that the body 30 and the lifting mechanism 40 are locked to the base 20. The rotated locking member 53 is illustrated with dotted lines in FIG. 4B. After the locking member 53 is driven by the second lever end 52b to rotate relative to the base 20, an engaging relationship between the first engaging portion 53a and the second engaging portion 32a is removed, and a locking relationship of the body 30 and the lifting mechanism 40 with respect to the base 20 is removed as well. After the locking relationship of the body 30 and the lifting mechanism 40 with respect to the base 20 is removed, the lifting mechanism 40 may rise up relative to the base 20 and drive the body 30 to move synchronously, so that the first engaging portion 53a is separated from the second engaging portion 32a.

That is, the locking relationship of the body 30 and the lifting mechanism 40 with respect to the base 20 is determined by the switching mechanism 50. Specifically, the locking member 53 may lock the body 30 and the lifting mechanism 40 to the base 20, and the user may control the locking member 53 to rotate by the assistance of the switch button 51 and the switch lever 52 to remove the locking relationship of the body 30 and the lifting mechanism 40 with respect to the base 20. Therefore, for the user, the electronic device 10 and the expansion device 11 have excellent operation flexibility, and a shifting mechanism for operation modes is quite intuitive.

On the other hand, the base 20 has a recess 21. When the lifting mechanism 40 is yet to rise up relative to the base 20, the lifting mechanism 40 is located in the recess 21. When the lifting mechanism 40 rises up relative to the base 20, the lifting mechanism 40 moves out of the recess 21. When the lifting mechanism 40 drops off relative to the base 20, the lifting mechanism 40 moves back into the recess 21. Therefore, when the body 30 (i.e., the back side of the second display 32) is attached to the base 20, the overall thickness of the body 30 and the base 20 which overlap with each other is reduced by accommodating the lifting mechanism 40 in the recess 21.

Referring to FIG. 2A to FIG. 3, in the present embodiment, the lifting mechanism 40 includes a first stand 41, a second stand 42, a link 43, a spring 44, a baffle plate 45 and a damping element 46. The first stand 41, the second stand 42, the link 43, the spring 44 and the damping element 46 may be regarded as lifting assembly, and there are two lifting assembly. The aforementioned two lifting assembly are symmetrically disposed at the base 20 to improve the stability of the body 30 in lifting. On the other hand, the first stand 41, the second stand 42 and the link 43 may be regarded as a three-bar linkage, and the first stand 41 is connected to the second stand 42 through the link 43.

In detail, the first stand 41 has a first end 41a and a second end 41b. The first end 41a is slidably connected to the base 20, and the second end 41b is pivoted to the body 30 (i.e., the back side of the second display 32). The second stand 42 has a third end 42a and a fourth end 42b. The third end 42a is pivoted to the base 20, and the fourth end 42b is pivoted to the body 30 (i.e., the back side of the second display 32). The first end 41a of the first stand 41 is kept away from the third end 42a of the second stand 42 at a distance, and the distance changes as the first end 41a slides. On the other hand, the second end 41b of the first stand 41 is kept away from the fourth end 42b of the second stand 42 at a distance, and the distance is substantially fixed.

For example, the first end 41a of the first stand 41 and the third end 42a of the second stand 42 may be mounted on the base 20 through a fixed seat 47. The fixed seat 47 is fixed on the base 20. The first end 41a of the first stand 41 is slidably connected to the fixed seat 47, and the third end 42a of the second stand 42 is pivoted to the fixed seat 47. On the other hand, the second end 41b of the first stand 41 and the fourth end 42b of the second stand 42 may be mounted on the body 30 (i.e., the back side of the second display 32) through a fixed seat 48. The fixed seat 48 is fixed on the body 30 (i.e., the back side of the second display 32). The second end 41b of the first stand 41 is pivoted to the fixed seat 48, and the fourth end 42b of the second stand 42 is pivoted to the fixed seat 48.

The link 43 has a fifth end 43a and a sixth end 43b. The fifth end 43a is pivoted to the first end 41a, and the sixth end 43b is pivoted to the second stand 42. A pivot point of the sixth end 43b on the second stand 42 is located between the third end 42a and the fourth end 42b. On the other hand, the spring 44 is disposed at the third end 42a of the second stand 42, and the spring 44 is a torsional spring. When the lifting mechanism 40 is yet to rise up relative to the base 20, the spring 44 is compressed. After the locking relationship of the body 30 and the lifting mechanism 40 with respect to the base 20 is removed by the switching mechanism 50, the lifting mechanism 40 may automatically rise up by a restoring force of the spring 44. Further, the restoring force of the spring 44 may drive the second stand 42 to rotate relative to the base 20, and thus driving the first stand 41 to rotate and slide relative to the base 20 through the link 43.

In the present embodiment, the damping element 46 is connected to the first end 41a of the first stand 41. In the process that the lifting mechanism 40 rises up relative to the base 20, the first end 41a of the first stand 41 slides towards the third end 42a of the second stand 42, and the damping element 46 may be used to slow down the sliding of the first end 41a of the first stand 41, in order to prevent the lifting mechanism 40 from rising up too fast. For example, the damping element 46 may use a damping telescopic rod, a damper, a compression spring, a tension spring, or another suitable buffer body.

On the other hand, the base 20 may include a host computer with calculating and processing functions, and the rear side of the base 20 is provided with a heat dissipation hole. The second stand 42 is closer to the rear side of the base 20 than the first stand 41. The baffle plate 45 is connected to the second stand 42, and the second stand 42 is located between the first stand 41 and the baffle plate 45. Therefore, the baffle plate 45 may be used to block hot air discharged from the heat dissipation hole at the rear side of the base 20 to prevent the hot air from flowing to a position between the body 30 and the base 20.

It should be particularly noted that in the process that the lifting mechanism 40 rises up relative to the base 20, the first stand 41, the second stand 42, the link 43 and the baffle plate 45 may move out of the recess 21, but the spring 44 and the damping element 46 are still located in the recess 21.

As shown in FIG. 2A and FIG. 3, the base 20 is provided with a keyboard 22, and the lifting mechanism 40 and the keyboard 22 are arranged side by side. As shown in FIG. 1A and FIG. 1B, the lifting mechanism 40 and the body 30 do not rise up relative to the base 20, and the body 30 covers the keyboard 22 (see FIG. 2A) to hide the keyboard 22 (see FIG. 2A). As shown in FIG. 1C and FIG. 2A, after the lifting mechanism 40 and the body 30 rise up relative to the base 20, the body 30 moves away from the keyboard 22, so that the keyboard 22 is exposed outside, and thus facilitating the user to operate the keyboard 22.

Figure 5A:
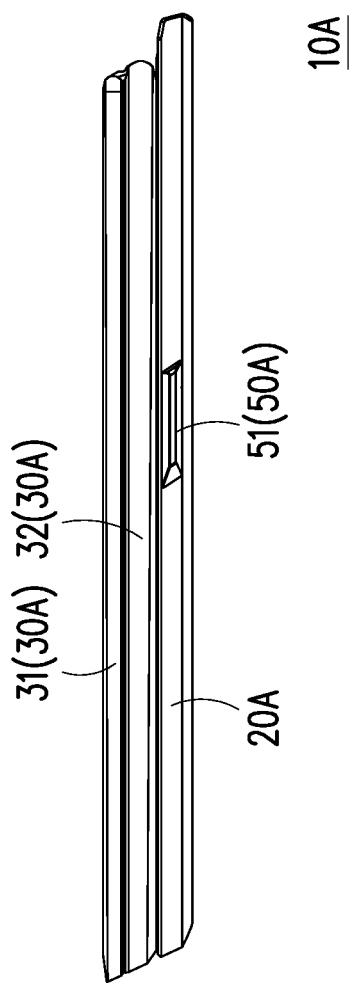
Figure 5B:
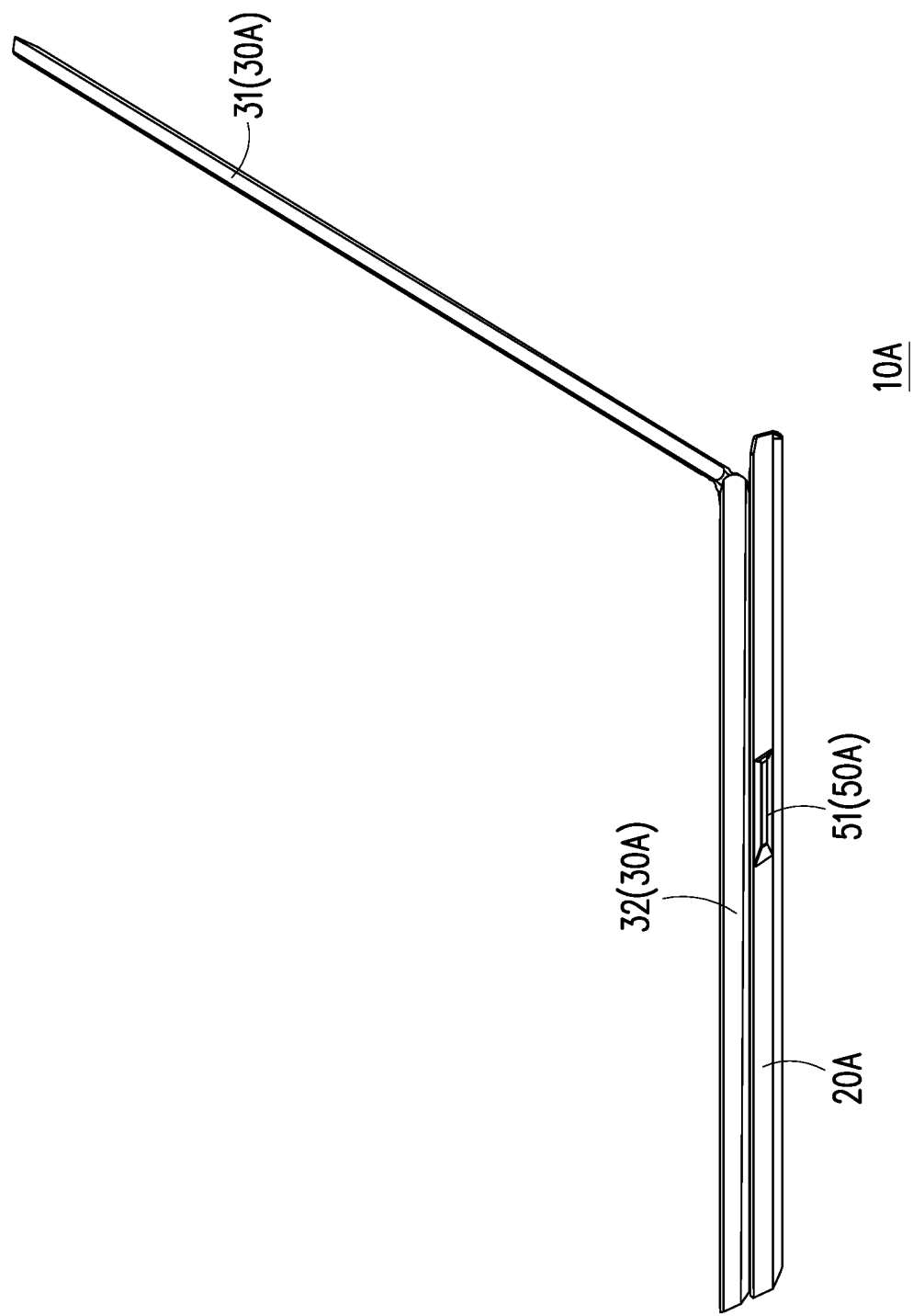

FIG. 5A to FIG. 5C are side-view diagrams of an electronic device of a second embodiment of the present disclosure under different operation modes. Referring to FIG. 5A to FIG. 5C, in the present embodiment, the electronic device 10A may be a notebook computer or a combination of a tablet computer and an expansion device. The electronic device 10A includes a base 20A, a body 30A and a lifting mechanism 40A. The body 30A and the lifting mechanism 40A are both movably disposed at the base 20A. The lifting mechanism 40A is located between the body 30A and the base 20A, and two ends of the lifting mechanism 40A are connected to the body 30A and the base 20A. The body 30A may rise up or drop off relative to the base 20A with the lifting mechanism 40A, so as to change an inclination angle of the body 30A relative to the base 20A.

Further, the body 30A includes a first display 31 and a second display 32 which are pivoted to each other, and the first display 31 and the second display 32 may have a touch function. As shown in FIG. 5A, the first display 31 and the second display 32 are in a folded state, and a back side of the second display 32 is attached to the base 20A. As shown in FIG. 5B, the first display 31 and the second display 32 are converted to an unfolded state, and the back side of the second display 32 is attached to the base 20A. For example, the second display 32 may be used to display a virtual keyboard or virtual operating interface, and thus facilitating the user to operate the body 30A. As shown in FIG. 5C, one end of the lifting mechanism 40A is connected to the second display 32, and the first display 31 and the second display 32 which are in the unfolded state rise up relative to the base 20A with the lifting mechanism 40A, so that the second display 32 is inclined to the base 20A. On the other hand, a side of the second display 32 may lean against the base 20A to improve the stability of the body 30A in the inclined state.

For example, the size of the first display 31 is equal to that of the second display 32, and the size of a display screen of the first display 31 may be equal to that of a display screen of the second display 32. After the first display 31 and the second display 32 are unfolded, the user may switch or operate screen images in the first display 31 and the second display 32 according to personal needs, and the first display 31 and the second display 32 are spliced to obtain a relatively large screen image, such as a size-doubled screen image. Further, the first display 31 and the second display 32 are supported by the lifting mechanism 40A and the base 20A, and viewing angles of the first display 31 and the second display 32 may be adjusted by the rise and drop of the lifting mechanism 40A, and thus contributing to relieve the fatigue of the eyes of the user.

Figure 6A:
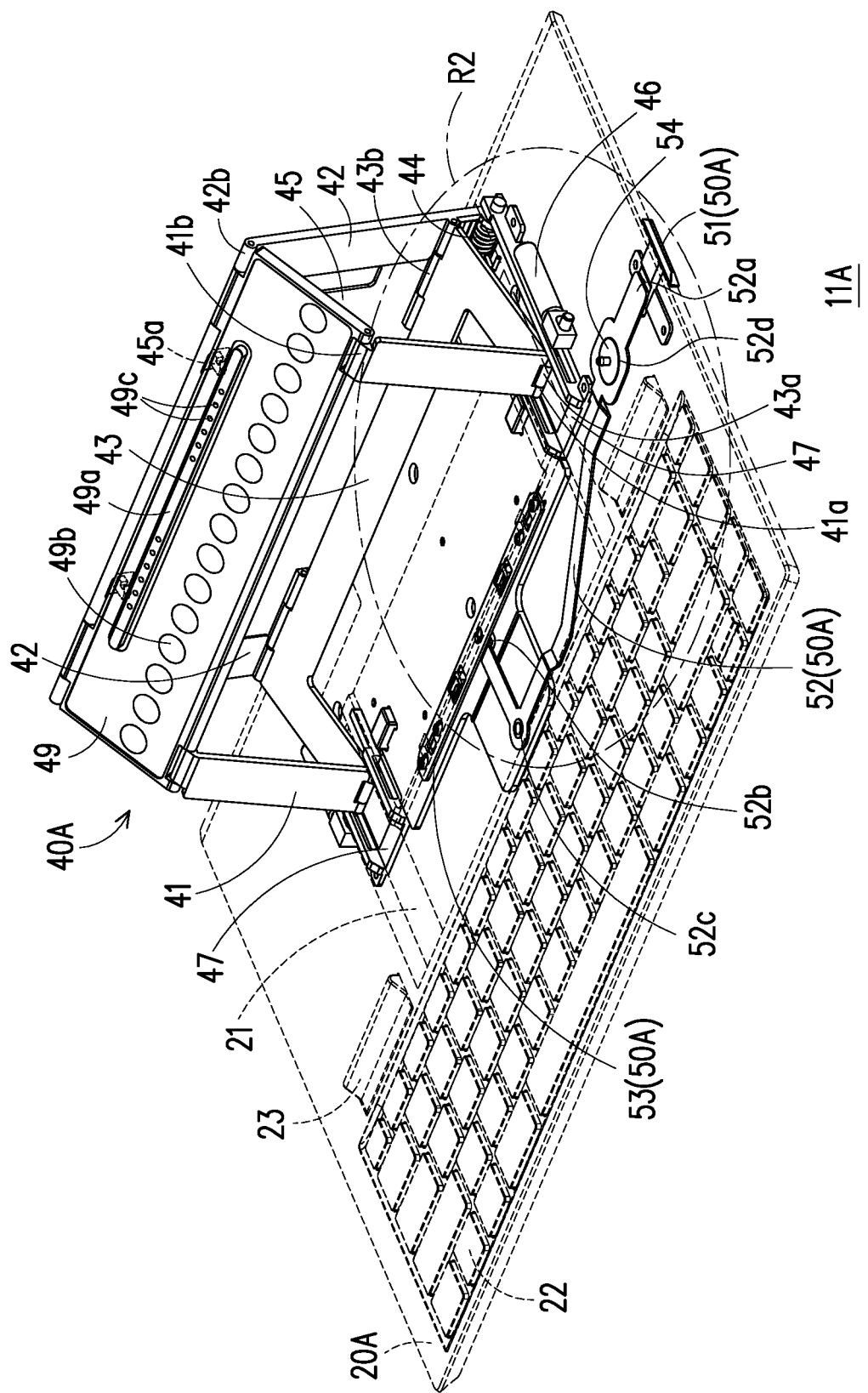
FIG. 6A is a schematic diagram of an expansion device of FIG. 5C.
Figure 6B:
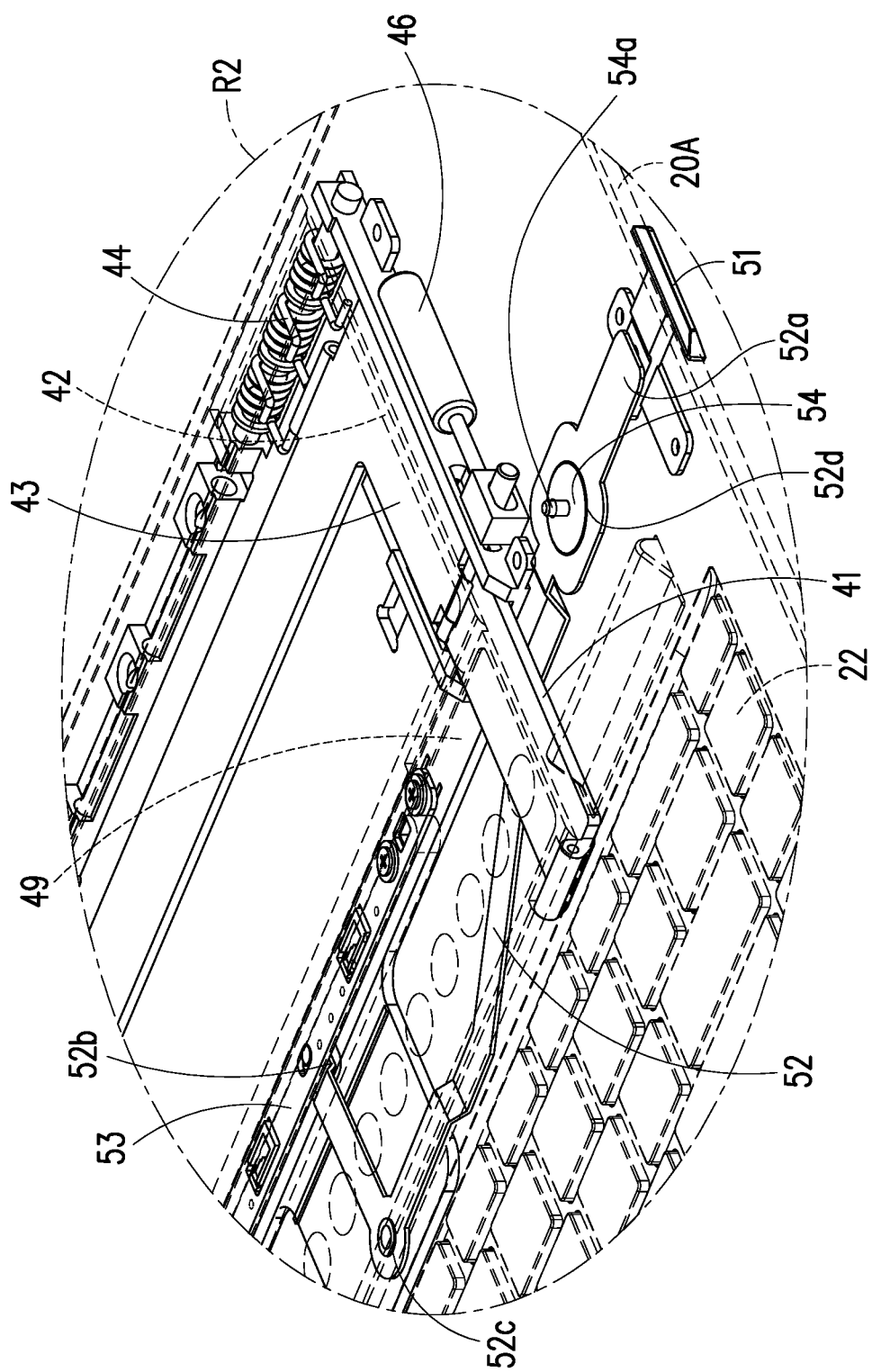
FIG. 6B is a partially enlarged diagram of a region R2 after a lifting mechanism of FIG. 6A drops off.
Figure 7A:
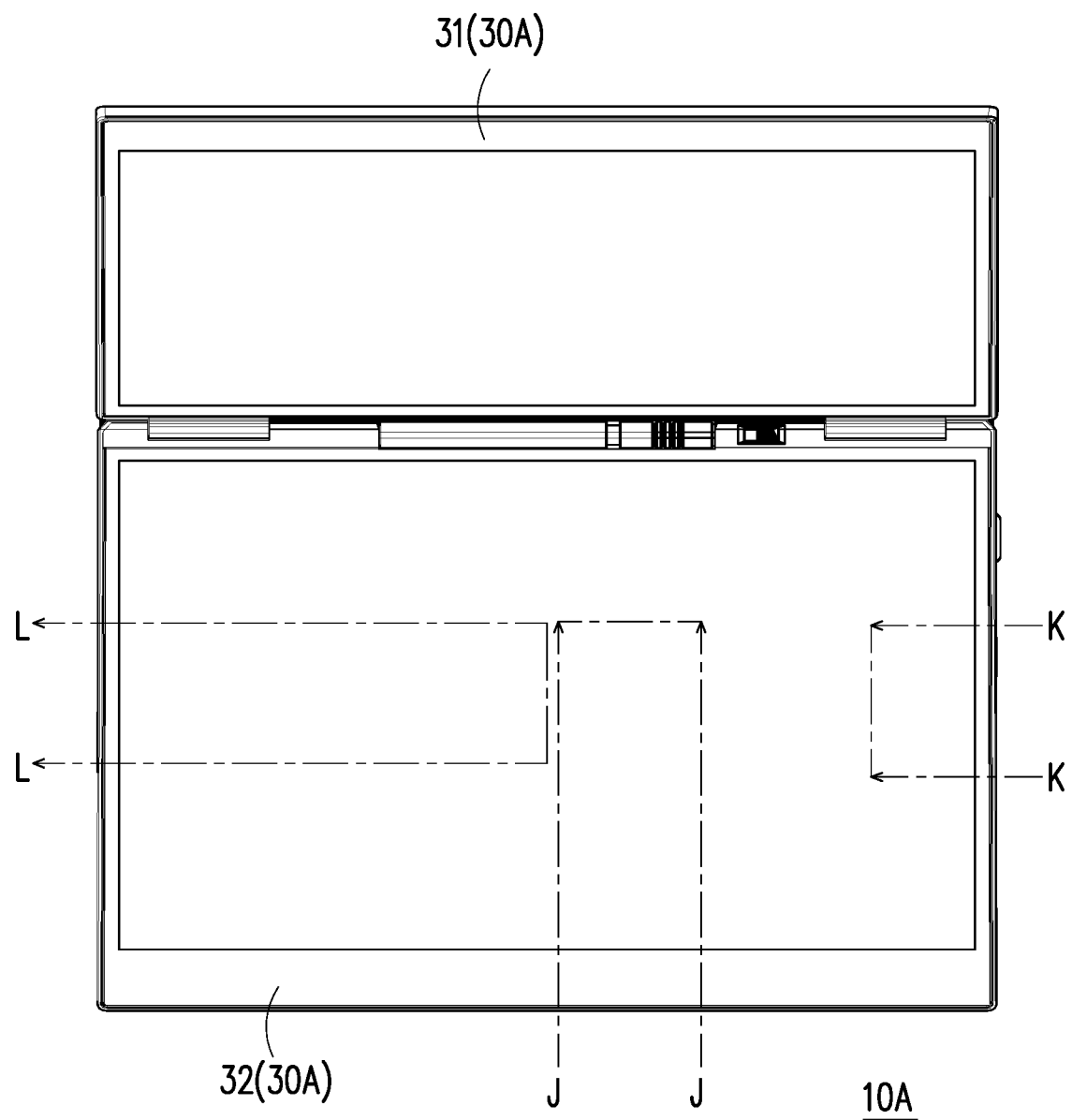
FIG. 7A is a top-view diagram of the electronic device of FIG. 5B.
Figure 7B:
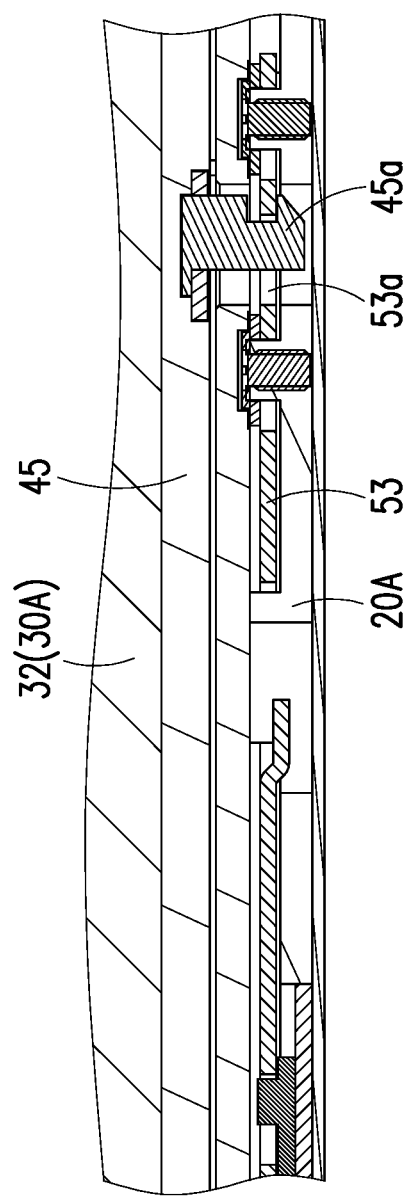
FIG. 7B is a partially cross-sectional enlarged diagram along a section line J-J of FIG. 7A.
Figure 7C:
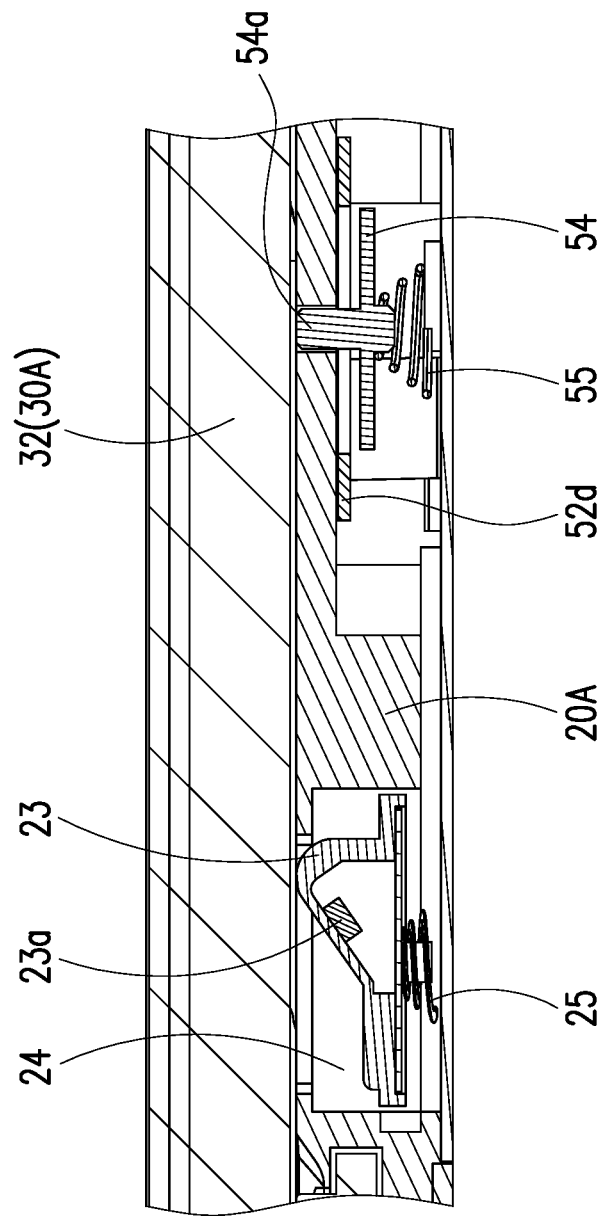
FIG. 7C is a partially cross-sectional enlarged diagram along a section line K-K of FIG. 7A.
Figure 7D:
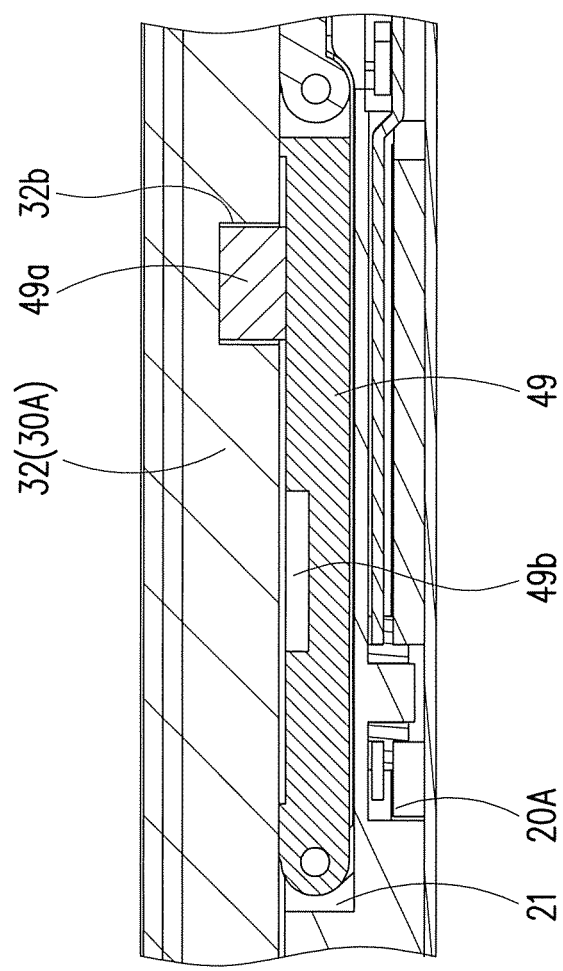
FIG. 7D is a partially cross-sectional enlarged diagram along a section line L-L of FIG. 7A.

FIG. 6A is a schematic diagram of an expansion device of FIG. 5C. FIG. 6B is a partially enlarged diagram of a region R2 after a lifting mechanism of FIG. 6A falls down. FIG. 7A is a top-view diagram of the electronic device of FIG. 5B. FIG. 7B is a partially cross-sectional enlarged diagram along a section line J-J of FIG. 7A. FIG. 7C is a partially cross-sectional enlarged diagram along a section line K-K of FIG. 7A. FIG. 7D is a partially cross-sectional enlarged diagram along a section line L-L of FIG. 7A. For clear illustration, part of members in FIG. 6A and FIG. 6B are illustrated with dotted lines. Referring to FIG. 5A to FIG. 6A, in the present embodiment, the electronic device 10A further includes a switching mechanism 50A. The switching mechanism 50A is disposed at the base 20A, and a combination of the switching mechanism 50A, the lifting mechanism 40A and the base 20A may be regarded as an expansion device 11A. The body 30A is detachably mounted on the lifting mechanism 40A. The lifting mechanism 40A includes a stand 41, a second stand 42, a link 43, a spring 44, a baffle plate 45, a damping element 46 and a supporting plate 49. The supporting plate 49 may be used to carry the body 30A.

In detail, the first stand 41 has a first end 41a and a second end 41b. The first end 41a is slidably connected to the base 20A, and the second end 41b is pivoted to one end of the supporting plate 49. The second stand 42 has a third end 42a and a fourth end 42b. The third end 42a is pivoted to the base 20A, and the fourth end 42b is pivoted to the other end of the supporting plate 49. That is, the second end 41b of the first stand 41 and the fourth end 42b of the second stand 42 may be indirectly pivoted to the body 30A through the supporting plate 49. On the other hand, the first end 41a of the first stand 41 is kept away from the third end 42a of the second stand 42 at a distance, and the distance changes as the first end 41a slides. On the other hand, the second end 41b of the first stand 41 is kept away from the fourth end 42b of the second stand 42 at a distance, and the distance is substantially fixed. For example, the first end 41a of the first stand 41 and the third end 42a of the second stand 42 may be mounted on the base 20A through a fixed seat 47. The fixed seat 47 is fixed on the base 20A. The first end 41a of the first stand 41 is slidably connected to the fixed seat 47, and the third end 42a of the second stand 42 is pivoted to the fixed seat 47.

The link 43 has a fifth end 43a and a sixth end 43b. The fifth end 43a is pivoted to the first end 41a, and the sixth end 43b is pivoted to the second stand 42. A pivot point of the sixth end 43b on the second stand 42 is located between the third end 42a and the fourth end 42b. On the other hand, the spring 44 is disposed at the third end 42a of the second stand 42, and the spring 44 is a torsional spring. When the lifting mechanism 40A is yet to rise up relative to the base 20A, the spring 44 is compressed. After the locking relationship of the body 30A and the lifting mechanism 40A with respect to the base 20A is removed by the switching mechanism 50A, the lifting mechanism 40A may automatically rise up by a restoring force of the spring 44. Further, the restoring force of the spring 44 may drive the second stand 42 to rotate relative to the base 20A, and thus driving the first stand 41 to rotate and slide relative to the base 20A through the link 43.

In the present embodiment, the damping element 46 is connected to the first end 41a of the first stand 41. In the process that the lifting mechanism 40A rises up relative to the base 20A, the first end 41a of the first stand 41 slides towards the third end 42a of the second stand 42, and the damping element 46 may be used to slow down the sliding of the first end 41a of the first stand 41, in order to prevent the lifting mechanism 40A from rising up too fast. For example, the damping element 46 may use a damping telescopic rod, a damper, a compression spring, a tension spring, or another suitable buffer body.

On the other hand, the base 20A may include a host computer with calculating and processing functions, and a rear side of the base 20A is provided with a heat dissipation hole. The second stand 42 is closer to the rear side of the base 20A than the first stand 41. The baffle plate 45 is connected to the second stand 42, and the second stand 42 is located between the first stand 41 and the baffle plate 45. Therefore, the baffle plate 45 may be used to block hot air discharged from the heat dissipation hole at the rear side of the base 20A to prevent the hot air from flowing to a position between the body 30A and the base 20A.

It should be particularly noted that in the process that the lifting mechanism 40A rises up relative to the base 20A, the first stand 41, the second stand 42, the link 43 and the baffle plate 45 may move out of the recess 21, but the spring 44 and the damping element 46 are still located in the recess 21.

As shown in FIG. 6A, the base 20A is provided with a keyboard 22, and the lifting mechanism 40A and the keyboard 22 are arranged side by side. As shown in FIG. 5A and FIG. 5B, the lifting mechanism 40A and the body 30A do not rise up relative to the base 20A, and the body 30A covers the keyboard 22 (see FIG. 6A) to hide the keyboard 22 (see FIG. 6A). As shown in FIG. 5C and FIG. 6A, after the lifting mechanism 40A and the body 30A rise up relative to the base 20A, the body 30A moves away from the keyboard 22, so that the keyboard 22 is exposed outside, and thus facilitating the user to operate the keyboard 22.

Referring to FIG. 5C, FIG. 6A, FIG. 7A and FIG. 7D, the supporting plate 49 is provided with a positioning convex portion 49a, and the positioning convex portion 49a is back on to the base 20A. The body 30A has a positioning concave portion 32b located at the back side of the second display 32. In the process of mounting the body 30A to the supporting plate 49, the positioning convex portion 49a may be inserted into the positioning concave portion 32b to position the body 30A (i.e., the second display 32) to the supporting plate 49, so as to prevent the body 30A (i.e., the second display 32) from sliding randomly. For example, the positioning convex portion 49a and the positioning concave portion 32b may be a combination of an electric connection plug and an electric connection slot, and the positioning convex portion 49a is provided with a plurality of conductive terminals 49c. On the other hand, the supporting plate 49 may be provided with a magnet 49b, configured to attract and position the body 30A (i.e., the second display 32) to the supporting plate 49.

Referring to FIG. 6A to FIG. 6B, the switching mechanism 50A includes a switch button 51, a switch lever 52 and a locking member 53. The switch button 51 is slidably disposed at a side of the base 20A, and thus facilitating the user to operate the switch button 51. The switch lever 52 is rotatably disposed at the base 20A, and the switch lever 52 includes a first lever end 52a, a second lever end 52b, a pivoting portion 52c and a pivoting limiting portion 52d. The first lever end 52a is connected to the switch button 51, and the first lever end 52a has freedom of motion of rotation and sliding relative to the switch button 51. The second lever end 52b is connected to the locking member 53, and the second lever end 52b has freedom of motion of rotation and sliding relative to of the locking member 53. The locking member 53 is slidably disposed at the base 20A, and the second lever end 52b is configured to drive the locking member 53 to slide. The pivoting portion 52c may be a pivoting hole of the switch lever 52, and a positioning pin of the base 20A is inserted into the pivoting portion 52c. The pivoting portion 52c is located between the first lever end 52a and the second lever end 52b and serves as a rotation fulcrum of the switch lever 52. The pivoting limiting portion 52d is located between the pivoting portion 52c and the first lever end 52a, and the pivoting limiting portion 52d is configured to determine whether the switch lever 52 may rotate relative to the base 20A under the action of a force.

Further, the switch mechanism 50A further includes a pivoting limiting member 54. In the state of FIG. 6A and FIG. 6B, the pivoting limiting member 54 is engaged with an engaging hole of the pivoting limiting portion 52d. Accordingly, the switch lever 52 is limited by two points (i.e., the pivoting portion 52c and the pivoting limiting portion 52d) and is unable to rotate relative to the base 20A under the action of the force. The pivoting limiting member 54 has a convex pillar 54a penetrating through the base 20A. If the body 30A (i.e., the second display 32) presses or applies a force to press the convex pillar 54a of the pivoting limiting member 54, the pivoting limiting member 54 sinks and moves out of the engaging hole of the pivoting limiting portion 52d. As shown in FIG. 7C, the pivoting limiting member 54 is separated from the pivoting limiting portion 52d.

Referring to FIG. 6A to FIG. 7C, after the pivoting limiting member 54 is separated from the pivoting limiting portion 52d, the user may drive the switch button 51 to slide, and then the switch button 51 drives the switch lever 52 to rotate, and the first lever end 52a and the second lever end 52b rotate around the pivoting portion 52c. Then, the locking member 53 is driven by the second lever end 52b to slide relative to the base 20A. The locking member 53 includes a first engaging portion 53a facing the lifting mechanism 40A. The lifting mechanism 40A includes a second engaging portion 45a facing the base 20A. The second engaging portion 45a is disposed at a side of the baffle plate 45 facing the base 20A. For example, the first engaging portion 53a may be a slot, the second engaging portion 45a may be a hook, and the second engaging portion 45a is configured to be engaged with the first engaging portion 53a. In the state that the second engaging portion 45a is engaged with the first engaging portion 53a, the lifting mechanism 40A is unable to rise up relative to the base 20A, so that the lifting mechanism 40 is locked to the base 20A.

After the locking member 53 is driven by the second lever end 52b to rotate relative to the base 20A, the engaging relationship between the second engaging portion 45a and the first engaging portion 53a is removed, and meanwhile, the locking relationship of the lifting mechanism 40A with respect to the base 20A is removed as well. After the locking relationship of the lifting mechanism 40A with respect to the base 20A is removed, the lifting mechanism 40A may rise up relative to the base 20A and drive the body 30A to move synchronously, so that the first engaging portion 53a is separated from the second engaging portion 45a, as shown in FIG. 5C and FIG. 6A.

That is, the locking relationship of the lifting mechanism 40A with respect to the base 20A is determined by the switching mechanism 50A. Specifically, the locking member 53 may lock the lifting mechanism 40A to the base 20A, and the user may control the locking member 53 to slide by the assistance of the switch button 51 and the switch lever 52 to remove the locking relationship of the lifting mechanism 40A with respect to the base 20A. Therefore, for the user, the electronic device 10A and the expansion device 11A have excellent operation flexibility, and the shifting mechanism for operation modes is quite intuitive. In addition, the switching mechanism 50A integrates a design for mistaken touch prevention, namely a combination of the pivoting limiting member 54 and the pivoting limiting portion 52d.

On the other hand, the base 20A has a recess 21. When the lifting mechanism 40A is yet to rise up relative to the base 20A, the lifting mechanism 40A is located in the recess 21. When the lifting mechanism 40A rise up relative to the base 20A, the lifting mechanism 40A moves out of the recess 21. When the lifting mechanism 40A drops off relative to the base 20A, the lifting mechanism 40A moves back into the recess 21. Therefore, when the body 30A (i.e., the back side of the second display 32) is attached to the base 20A, the overall thickness of the body 30A and the base 20A which overlap each other is reduced by accommodating the lifting mechanism 40A in the recess 21.

Referring to FIG. 7C, the pivoting limiting member 54 is supported by the spring 55. When the pivoting limiting member 54 is pressed by a force to sink, the spring 55 is compressed. On the contrary, after the pressing force acting on the pivoting limiting member 54 is removed, a restoring force of the spring 55 may drive the pivoting limiting member 54 to restore and be engaged with the pivoting limiting portion 52d again, as shown in FIG. 6A and FIG. 6B. For example, the spring 55 may be a conical spring with a narrow upper part and a wide lower part, so as to ensure that the pivoting limiting member 54 moves along the vertical direction.

Referring to FIG. 5C, FIG. 6A, FIG. 7A and FIG. 7C, the base 20A is provided with a lifting cushion 23 and a groove 24 for receiving the lifting cushion 23, and the lifting cushion 23 is located between the lifting mechanism 40A and the keyboard 22. In the state as shown in FIG. 5C and FIG. 6A, the lifting cushion 23 at least partially moves out of the groove 24 to allow a side of the body 30A (i.e., the second display 32) to lean against thereon. On the other hand, a magnet 23a is embedded into the lifting cushion 23 to attract and position the body 30A (i.e., the second display 32) to the base 20A. In the state as shown in FIG. 7C, a force is applied to press the lifting cushion 23 or enable the body 30A (i.e., the second display 32) to press lifting cushion 23, so that the lifting cushion 23 sinks into the groove 24.

The lifting cushion 23 is supported by the spring 25. When the lifting cushion 23 is pressed by a force to sink, the spring 25 is compressed. On the contrary, after the pressing force acting on the lifting cushion 23 is removed, a restoring force of the spring 25 may drive the lifting cushion 23 to restore and enable the lifting cushion 23 to at least partially move out of the groove 24, as shown in FIG. 6A and FIG. 6B. For example, the spring 25 may be a conical spring with a narrow upper part and a wide lower part, so as to ensure that the lifting cushion 23 moves along a vertical direction.

Based on the above, the lifting mechanisms of the electronic device and the expansion device of the present disclosure may rise up or drop off relative to the base, so as to change the inclination angle of the body relative to the base. Further, the locking relationship of the body and the lifting mechanism with respect to the base is determined by the switching mechanism, so that the body and the lifting mechanism may be locked to the base through the switching mechanism, or the locking relationship of the body and the lifting mechanism with respect to the base is removed by the switching mechanism. After the locking relationship of the body and the lifting mechanism with respect to the base is removed by the switching mechanism, the lifting mechanism may automatically rise up by the restoring force of the spring. Therefore, for the user, the electronic device and the expansion device of the present disclosure have excellent operation flexibility, and the shifting mechanism for operation modes is quite intuitive.

On the other hand, the body includes the first display and the second display which are pivoted to each other. After the first display and the second display are unfolded, the user may switch or operate screen images in the first display and the second display according to personal needs, and the first display and the second display are spliced to obtain the relatively large screen image, such as a size-doubled screen image. Further, the first display and the second display are supported by the lifting mechanism and the base, and the viewing angles of the first display and the second display may be adjusted by the rise and drop of the lifting mechanism, and thus relieving the feeling fatigue of the eyes of the user.

Although the present disclosure is described with reference to the above embodiments, the embodiments are not intended to limit the present disclosure. A person of ordinary skill in the art may make variations and modifications without departing from the spirit and scope of the present disclosure. Therefore, the protection scope of the present disclosure should be subject to the appended claims.

What is claimed is:

1. An electronic device, comprising:
   a base;
   a lifting mechanism, movably disposed at the base;
   a body, movably disposed at the base, wherein the lifting mechanism is located between the body and the base, and two ends of the lifting mechanism are connected to the body and the base; and
   a switching mechanism, disposed at the base, wherein the switching mechanism is configured to lock the body and the lifting mechanism to the base or configured to remove a locking relationship of the body and the lifting mechanism with respect to the base, wherein the switching mechanism comprises a switch button, a switch lever and a locking member, and the switch button is slidably disposed at a side of the base, the switch lever is rotatably disposed at the base, wherein the switch lever comprises a first lever end and a second lever end, the first lever end is connected to the switch button, and the second lever end is connected to the locking member, the locking member is configured to lock the body and the lifting mechanism to the base or configured to remove the locking relationship of the body and the lifting mechanism with respect to the base, wherein the locking member is slidably disposed at the base, and the locking member comprises a first engaging portion facing the lifting mechanism, the lifting mechanism comprises a second engaging portion facing the base, and the first engaging portion is engaged with or separated from the second engaging portion.

2. The electronic device according to claim 1, wherein the body comprises a first display and a second display, and the first display is pivoted to the second display, and the second display is connected to the lifting mechanism.

3. The electronic device according to claim 2, wherein the size of the first display is equal to that of the second display.

4. The electronic device according to claim 1, wherein the switch lever comprises a pivoting portion, and the pivoting portion is pivoted to the base, and the pivoting portion is located between the first lever end and the second lever end.

5. The electronic device according to claim 4, wherein the switch lever further comprises a pivoting limiting portion, and the pivoting limiting portion is located between the pivoting portion and the first lever end, the switching mechanism further comprises a pivoting limiting member, and the pivoting limiting member is engaged with the pivoting limiting portion, or the pivoting limiting member is pressed by the body to be separated from the pivoting limiting portion.

6. The electronic device according to claim 1, wherein the base comprises a recess, configured to receive the lifting mechanism.

7. The electronic device according to claim 1, wherein the lifting mechanism comprises a first stand, a second stand and a link, the first stand comprises a first end and a second end, wherein the first end is slidably connected to the base, and the second end is pivoted to the body, the second stand comprises a third end and a fourth end, wherein the third end is pivoted to the base, and the fourth end is pivoted to the body, the link comprises a fifth end and a sixth end, wherein the fifth end is pivoted to the first end, and the sixth end is pivoted to the second stand, and the sixth end is located between the third end and the fourth end.

8. The electronic device according to claim 7, wherein the lifting mechanism further comprises a spring, and the spring is disposed at the third end of the second stand.

9. The electronic device according to claim 7, wherein the lifting mechanism further comprises a supporting plate configured to carry the body, and the second end of the first stand is pivoted to the supporting plate, and the fourth end of the second stand is pivoted to the supporting plate.

10. The electronic device according to claim 9, wherein the supporting plate comprises a positioning convex portion, and the body comprises a positioning concave portion, and the positioning convex portion is inserted into the positioning concave portion.

11. The electronic device according to claim 10, wherein the positioning convex portion of the supporting plate is provided with a plurality of conductive terminals.

12. The electronic device according to claim 7, wherein the lifting mechanism further comprises a baffle plate connected to the second stand, and the second stand is located between the first stand and the baffle plate.

13. The electronic device according to claim 7, wherein the lifting mechanism further comprises a damping element, and the damping element is connected to the first end of the first stand.

14. The electronic device according to claim 1, wherein the base is provided with a keyboard, and the lifting mechanism and the keyboard are arranged side by side.

15. The electronic device according to claim 14, wherein the base is provided with a lifting cushion and a groove for receiving the lifting cushion, and the lifting cushion is located between the lifting mechanism and the keyboard, the lifting cushion at least partially moves out of the groove to allow a side of the body to lean against thereon or the lifting cushion is pressed by the body to sink into the groove.

16. The electronic device according to claim 14, wherein the keyboard is covered by the body, and after the body rises up with the lifting mechanism, the keyboard is exposed outside.

17. An expansion device, comprising:

a base;

a lifting mechanism, movably disposed at the base; and a switching mechanism, disposed at the base, wherein the switching mechanism comprises a switch lever, and the switch lever is rotatably disposed at the base, the switching mechanism is configured to lock the lifting mechanism to the base or configured to remove a locking relationship of the lifting mechanism with respect to the base, wherein the switching mechanism further comprises a switch button and a locking member, and the switch button is slidably disposed at a side of the base, the switch lever comprises a first lever end and a second lever end, the first lever end is connected to the switch button, and the second lever end is connected to the locking member, the locking member is configured to lock the lifting mechanism to the base or configured to remove the locking relationship of the lifting mechanism with respect to the base, wherein the locking member is slidably disposed at the base, and the locking member comprises a first engaging portion facing the lifting mechanism, the lifting mechanism comprises a second engaging portion facing the base, and the first engaging portion is engaged with or separated from the second engaging portion.

18. The expansion device according to claim 17, wherein the switch lever comprises a pivoting portion, and the pivoting portion is pivoted to the base, and the pivoting portion is located between the first lever end and the second lever end.

19. The expansion device according to claim 18, wherein the switch lever further comprises a pivoting limiting portion, and the pivoting limiting portion is located between the pivoting portion and the first lever end, the switching mechanism further comprises a pivoting limiting member, and the pivoting limiting member is engaged with the pivoting limiting portion, or the pivoting limiting member is pressed by a force to be separated from the pivoting limiting portion.

20. The expansion device according to claim 17, wherein the lifting mechanism comprises a first stand, a second stand, a link and a supporting plate,
   the first stand comprises a first end and a second end, wherein the first end is slidably connected to the base, and the second end is pivoted to the supporting plate,
   the second stand comprises a third end and a fourth end, wherein the third end is pivoted to the base, and the fourth end is pivoted to the supporting plate,
   the link comprises a fifth end and a sixth end, wherein the fifth end is pivoted to the first end, and the sixth end is pivoted to the second stand, and the sixth end is located between the third end and the fourth end.

21. The expansion device according to claim 20, wherein the lifting mechanism further comprises a spring, and the spring is disposed at the third end of the second stand.

22. The expansion device according to claim 20, wherein the supporting plate comprises a positioning convex portion, and the positioning convex portion is back on to the base.

23. The expansion device according to claim 22, wherein the positioning convex portion of the supporting plate is provided with a plurality of conductive terminals.

24. The expansion device according to claim 20, wherein the lifting mechanism further comprises a damping element, and the damping element is connected to the first end of the first stand.

25. The expansion device according to claim 17, wherein the base is provided with a keyboard, and the lifting mechanism and the keyboard are arranged side by side.

26. The expansion device according to claim 25, wherein the base is provided with a lifting cushion and a groove for receiving the lifting cushion, and the lifting cushion is located between the lifting mechanism and the keyboard,
   the lifting cushion at least partially moves out of the groove to allow a side of a body to lean against thereon or the lifting cushion is pressed by a force to sink into the groove.

* * * * *